(12) United States Patent
Cargnelli et al.

(10) Patent No.: US 7,323,263 B2
(45) Date of Patent: Jan. 29, 2008

(54) FUEL CELL SYSTEM AND METHOD OF OPERATION TO REDUCE PARASITIC LOAD OF FUEL CELL PERIPHERALS

(75) Inventors: Joseph Cargnelli, Toronto (CA); Todd A. Simpson, Brampton (CA); Stephen Burany, Thornhill (CA)

(73) Assignee: Hydrogenics Corporation, Mississauga (CA)

( * ) Notice: Subject to any disclaimer, the term of this patent is extended or adjusted under 35 U.S.C. 154(b) by 364 days.

(21) Appl. No.: 10/667,901

(22) Filed: Sep. 23, 2003

(65) Prior Publication Data

US 2004/0146761 A1 Jul. 29, 2004

Related U.S. Application Data

(60) Provisional application No. 60/412,548, filed on Sep. 23, 2002.

(51) Int. Cl.
*H01M 8/04* (2006.01)
*H01M 8/00* (2006.01)

(52) U.S. Cl. .............. 429/22; 429/23; 429/26; 429/13

(58) Field of Classification Search ............. 429/22, 429/23, 24, 25, 26, 13, 17, 21; 700/286, 700/297, 282; 702/60, 80
See application file for complete search history.

(56) References Cited

U.S. PATENT DOCUMENTS

| | | | |
|---|---|---|---|
| 3,098,769 A | 7/1963 | Liebhafsky et al. | |
| 5,202,195 A | 4/1993 | Stedman et al. | |
| 5,290,641 A * | 3/1994 | Harashima | 429/17 |
| 5,372,617 A | 12/1994 | Kerrebrock et al. | |
| 5,702,491 A | 12/1997 | Long et al. | |
| 2005/0008905 A1* | 1/2005 | Blum et al. | 429/13 |
| 2005/0136311 A1* | 6/2005 | Ueda et al. | 429/30 |

FOREIGN PATENT DOCUMENTS

| | | |
|---|---|---|
| CA | 2 028 978 | 5/1992 |
| EP | 1170249 A1 | 1/2002 |
| WO | WO 03/006366 A1 | 1/2003 |

OTHER PUBLICATIONS

Steven C. Amendola et al., "A safe, portable, hydrogen gas generator using aqueous borohydride solution and Ru catalyst", International Journal of Hydrogen Energy, 25 (2000), pp. 969-975, Elsevier Science Ltd.

* cited by examiner

*Primary Examiner*—Raymond Alejandro
(74) *Attorney, Agent, or Firm*—Bereskin & Parr (57) ABSTRACT

A fuel cell system and a method of operating same are provided. The fuel cell system includes a fuel cell for driving a load, at least one fuel cell peripheral, a device for measuring at least one fuel cell operation characteristic, and at least one controller for controlling the operation of at least one fuel cell peripheral based on the at least one fuel cell operation characteristic. The fuel cell operation characteristic is divided into at least two ranges, and operation of at least one fuel cell is controlled to provide it with a respective operational characteristic for each range of operation of the fuel cell system.

18 Claims, 8 Drawing Sheets

FUEL CELL SYSTEM AND METHOD OF OPERATION TO REDUCE PARASITIC LOAD OF FUEL CELL PERIPHERALS

FIELD OF THE INVENTION

The present invention relates generally to a fuel cell system. More particularly, the present invention relates to a method of operating a fuel cell system to minimize parasitic load.

BACKGROUND OF THE INVENTION

Fuel cell systems are seen as a promising alternative to traditional power generation technologies due to their low emissions, high efficiency and ease of operation. Fuel cells operate to convert chemical energy into electrical energy. Proton exchange membrane fuel cells comprise an anode, a cathode, and a selective electrolytic membrane disposed between the two electrodes. In a catalyzed reaction, a fuel such as hydrogen, is oxidized at the anode to form cations (protons) and electrons. The ion exchange membrane facilitates the migration of protons from the anode to the cathode. The electrons cannot pass through the membrane and are forced to flow through an external circuit thus providing an electrical current. At the cathode, oxygen reacts at the catalyst layer, with electrons returned from the electrical circuit, to form anions. The anions formed at the cathode react with the protons that have crossed the membrane to form liquid water as the reaction product.

Proton exchange membranes require a wet surface to facilitate the conduction of protons from the anode to the cathode, and otherwise to maintain the membranes electrically conductive. It has been suggested that each proton that moves through the membrane drags at least two or three water molecules with it (U.S. Pat. No. 5,996,976). U.S. Pat. No. 5,786,104 describes in qualitative terms a mechanism termed "water pumping", involving the transport of cations (protons) with water molecules through the membrane. As the current density increases, the number of water molecules moved through the membrane also increases. Eventually the flux of water being pulled through the membrane by the proton flux exceeds the rate at which water is replenished by diffusion. At this point the membrane begins to dry out, at least on the anode side, and its internal resistance increases. It will be appreciated that this mechanism drives water to the cathode side, and additionally the water created by reaction is formed at the cathode side. Nonetheless, it is possible for the flow of gas across the cathode side to be sufficient to remove this water, resulting in drying out on the cathode side as well. To maintain membrane conductivity, the surface of the membrane must remain moist at all times. Therefore, to ensure adequate efficiency, the process gases must be, on entering the fuel cell, at an appropriate humidity and at a suitable temperature for keeping the membrane moist. The range for suitable humidities and temperatures will depend on system requirements.

A further consideration is that there is an increasing interest in using fuel cells in transport and like applications, e.g. as the basic power source for cars, buses and even larger vehicles. Automotive applications are quite different from many stationary applications. For example in stationary applications, fuel cell stacks are commonly used as an electrical power source and are simply expected to run at a relatively constant power level for an extended period of time. In contrast, in an automotive environment, the actual power required from the fuel cell stack can vary widely. Additionally, the fuel cell stack supply unit is expected to respond rapidly to changes in power demand, whether these be demands for increased or reduced power, while maintaining high efficiencies. Further, for automotive applications, a fuel cell power unit is expected to operate under an extreme range of ambient temperature and humidity conditions.

All of these requirement are exceedingly demanding and make it difficult to ensure a fuel cell stack will operate efficiently under all of the possible range of operating conditions. Meeting these requirements depends on maintaining effective control over the fuel cell operating conditions.

Accordingly, there remains a need for a fuel cell gas management system that can offer rapid dynamic control of fuel cell operating conditions.

SUMMARY OF THE INVENTION

Many different operational parameters of the fuel cell system can advantageously be changed based on the operating level of the fuel system. Some examples are the rate at which coolant is recirculated, the rate at which hydrogen is recirculated, the rate at which hydrogen is purged and the rate at which reactants are supplied. That is, if the operating level of a fuel cell system increases significantly without a concomitant increase in the above-mentioned operational parameters, then contaminants will build up in the system, resulting in a decrease in both operational efficiency and in the operating lifetime of the fuel cell system.

At the same time, it is important for efficiency reasons that the parasitic load placed on the fuel cell system by these fluid cell peripherals be minimized. Thus, the fluid cell peripherals should not run at high levels when the fuel cell is operating at a low level.

In accordance with an aspect of the present invention, there is provided a fuel cell system comprising: (a) fuel cell for driving a load; (b) at least one fuel cell peripheral; (c) a measurement means for determining at least one fuel cell operation characteristic indicative of the power output of the fuel cell and having a fuel cell operation characteristic spectrum; and (d) at least one controller for controlling the operation of the at least one fuel cell peripheral based on the at least one fuel cell operation characteristic;

wherein said at least one fuel cell peripheral comprises at least one of a coolant recirculation pump, a hydrogen recirculation pump, and a hydrogen purging means;

wherein each fuel cell operation characteristic spectrum is divided into at least two ranges indicative of at least two corresponding ranges of power output, and the controller is adapted to control said at least one fuel cell peripheral to provide a respective operational characteristic for said at least one fuel cell peripheral for each range.

In accordance with a second aspect of the present invention, there is provided a method of operating a fuel cell system comprising a fuel cell, and at least one fuel cell peripheral. The method comprises a) providing at least one of a coolant recirculation pump, a hydrogen recirculation pump and a hydrogen purging means as the at least one fuel cell peripheral; b) connecting a load to the fuel cell system and providing a drive current from the fuel cell system to drive the load; c) measuring at least one fuel cell operation characteristic; and d) controlling an operational characteristic of the at least one fuel cell peripheral based on the at least one fuel cell characteristic, and for at least two different ranges of the fuel cell operation characteristic, providing a respective operational characteristic for said at least one fuel cell peripheral.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

Figure 1:
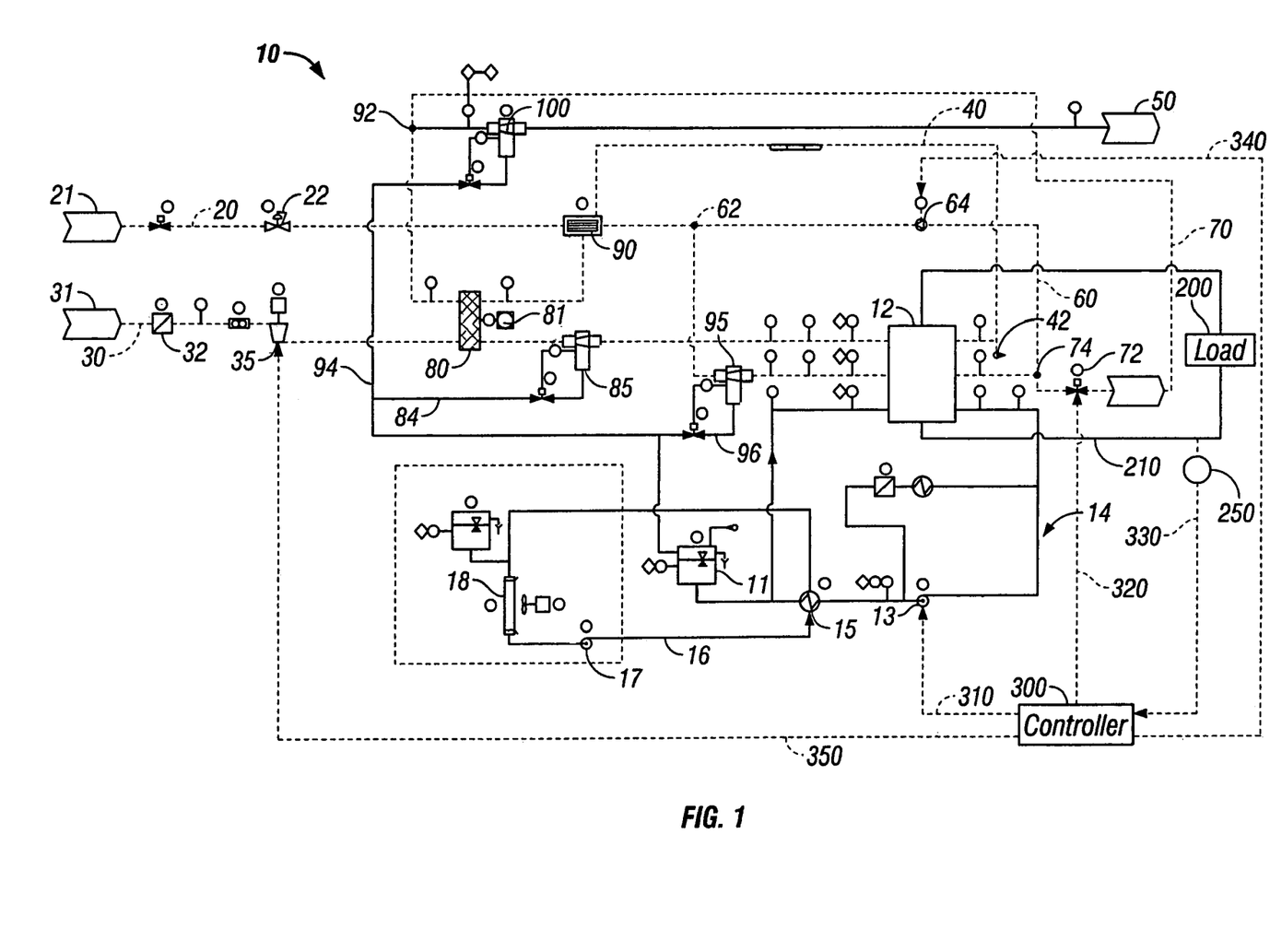
FIG. 1 illustrates a schematic flow diagram of a first embodiment of a fuel cell gas and water management system according to the present invention.

Referring first to FIG. 1, there is illustrated a schematic flow diagram of a first embodiment of a fuel cell gas management system 10 according to the present invention. The fuel cell gas management system 10 comprises a fuel supply line 20, an oxidant supply line 30, a cathode exhaust recirculation line 40 and an anode exhaust recirculation line 60, all connected to a fuel cell 12. It is to be understood that the fuel cell 12 may comprise a plurality of fuel cells or just a single fuel cell. For simplicity, the fuel cell 12 described herein operates on hydrogen as fuel and air as oxidant and can be a Proton Exchange Membrane (PEM) fuel cell. However, the present invention is not limited to this type of fuel cells and is applicable to other types of fuel cells that rely on other fuels and oxidants.

The fuel supply line 20 is connected to a fuel source 21 for supplying hydrogen to the anode of the fuel cell 12. A hydrogen humidifier 90 is disposed in the fuel supply line 20 upstream from the fuel cell 12 and an anode water separator 95 is disposed between the hydrogen humidifier 90 and the fuel cell 12. The oxidant supply line 30 is connected to an oxidant source 31, e.g. ambient air, for supplying air to the cathode of the fuel cell 12. A regenerative dryer 80 is disposed in the oxidant supply line 30 upstream of the fuel cell 12 and also in the cathode recirculation line 40. A cathode water separator 85 is disposed between the regenerative dryer 80 and the fuel cell 12. The regenerative dryer 80 can comprise porous materials with a desiccant and may be any commercially available dryer suitable for fuel cell system. The regenerative dryer 80 has a switch means to allow gases from the oxidant supply line 30 and the oxidant recirculation line 40 to alternately pass through the regenerative dryer 80 to exchange heat and humidity. Dry ambient air enters the oxidant supply line 30 and first passes through an air filter 32 that filters out the impurity particles. A blower 35 is disposed upstream of the regenerative dryer 80, to draw air from the air filter 32 and to pass the air through the regenerative dryer 80.

A fuel cell cathode exhaust stream contains excess air, product water and water transported from the anode side, the air being nitrogen rich due to consumption of at least part of the oxygen in the fuel cell 12. The cathode exhaust stream is recirculated through the cathode exhaust recirculation line 40 connected to the cathode outlet of the fuel cell 12. The humid cathode exhaust stream first passes through a hydrogen humidifier 90 in which the heat and humidity is transferred to incoming dry hydrogen in the fuel supply line 20. The hydrogen humidifier 90 can be any suitable humidifier, such as that commercially available from Perma Pure Inc, Toms River, N.J. It may also be a membrane humidifier and other types of humidifier with either high or low saturation efficiency. In fact, the hydrogen humidifier 90 is also a regenerative dryer, however, in view of the different gases in the anode and cathode streams, regenerative dryers or other devices that permit significant heat mass interchange between the two streams cannot be used.

From the hydrogen humidifier 90, the fuel cell cathode exhaust stream continues to flow along the recirculation line 40 and passes through the regenerative dryer 80, as mentioned above. As the humid cathode exhaust passes through the regenerative dryer 80, the heat and moisture is retained in the porous paper or fiber material of the regenerative dryer 80. After the porous paper or fiber material of the regenerative dryer 80 has been humidified by the humid cathode exhaust pressing therethrough, the switch means of the regenerative dryer 80 switches the connection of the regenerative dryer 80 from the cathode exhaust stream to the incoming air stream, and the humidity retained in the porous paper or fiber material of the regenerative dryer 80 is then transferred to the incoming dry air stream passing through the regenerative dryer 80 in the oxidant supply line 30. Concurrently the cathode exhaust stream continues to flow along the recirculation line 40 to an exhaust water separator 100 in which the excess water, again in liquid form, that has not been transferred to the incoming hydrogen and air streams is separated from the exhaust stream. Then the exhaust stream is discharged to the environment along a discharge line 50.

A cathode outlet drain line 42 may optionally be provided in the recirculation line 40 adjacent the cathode outlet of the fuel cell to drain out any liquid water remaining or condensed out. The cathode outlet drain line 42 may be suitably sized so that gas bubbles in the drain line actually retain the water in the cathode outlet drain line and automatically drain water on a substantially regular basis, thereby avoiding the need of a drain valve that is commonly used in the field to drain water out of gas stream. Such a drain line can be used anywhere in the system where liquid water needs to be drained out from gas streams.

The humidified hydrogen from the hydrogen humidifier 90 flows along the fuel supply line 20 to the anode water separator 95 in which excess water is separated before the hydrogen enters the fuel cell 12. Likewise, the humidified air from the regenerative dryer 80 flows along the oxidant supply line 30 to the cathode water separator 85 in which excess liquid water is separated before the air enters the fuel cell 12.

Fuel cell anode exhaust comprising excess hydrogen and water is recirculated by a recirculation pump 64 along the anode recirculation line 60 connected to the anode outlet of the fuel cell 12. The anode recirculation line 60 connects to the fuel supply line 20 at a first joint 62 upstream from the anode water separator 95. The recirculation of the excess hydrogen together with water vapor not only permits utilization of hydrogen to the greatest possible extent and prevents liquid water from blocking hydrogen reactant delivery to the reactant sites, but also achieves self-humidification of the fuel stream since the water vapor from the recirculated hydrogen humidifies the incoming hydrogen from the hydrogen humidifier 90. This is highly desirable since this arrangement offers more flexibility in the choice of hydrogen humidifier 90 as the humidifier 90 does not then need to be a highly efficient one in the present system. By appropriately selecting the hydrogen recirculation flow rate, the required efficiency of the hydrogen humidifier 90 can be minimized. For example, supposing the fuel cell 12 needs one unit of hydrogen, hydrogen can be supplied from the hydrogen source in the amount of three units with two units of excess hydrogen recirculated together with water vapor. The speed of recirculation pump 64 may be varied to adjust the portion of recirculated hydrogen in the mixture of hydrogen downstream from the first joint 62. The selection of stoichiometry and recirculation pump 64 speed may eventually lead to the omission of the hydrogen humidifier 90.

In practice, since air is used as oxidant, it has been found that nitrogen crossover from the cathode side of the fuel cell to the anode side can occur, e.g. through the membrane of a PEM fuel cell. Therefore, the anode exhaust actually may contain some nitrogen and possibly other impurities. Recirculation of anode exhaust may result in the build-up of nitrogen and poison the fuel cell. Preferably, a hydrogen purge line 70 branches out from the fuel recirculation line 60 from a branch point 74 adjacent the fuel cell cathode outlet. A purge control device 72 is disposed in the hydrogen purge line 70 to purge a portion of the anode exhaust out of the recirculation line 60. The frequency and flow rate of the purge operation is dependent on the power on which the fuel cell 12 is running. When the fuel cell 12 is running at high power, it is desirable to purge a higher portion of anode exhaust. The purge control device 72 may be a solenoid valve or other suitable device.

The hydrogen purge line 70 runs from the branch point 74 to a second joint 92 at which it joins the cathode exhaust recirculation line 40. Then the mixture of purged hydrogen and the cathode exhaust from the regenerative dryer 80 passes through the exhaust water separator 100. Water is condensed in the water separator 100 and the remaining gas mixture is discharged to the environment along the discharge line 50. Alternatively, either the cathode exhaust recirculation line 40 or the purge line 70 can be connected directly into the water separator 100. It is also known to those skilled in the art that the purged hydrogen or the cathode exhaust from the regenerative dryer 80 can be separately discharged without condensing water therefrom.

Preferably, water separated by the anode water separator 95, cathode water separator 85, and the exhaust water separator 100 are not discharged, but rather the water is recovered respectively along anode inlet drain line 96, cathode inlet drain line 84 and discharge drain line 94 to a product water tank, for use in various processes.

As is known to those skilled in the art, a first cooling loop 14 runs through the fuel cell 12. A first coolant pump 13 is disposed in the first cooling loop 14 for circulating the coolant. The coolant may be any coolant commonly used in the field, such as any non-conductive water, glycol, etc. A first expansion tank 11 can be provided in known manner. A first heat exchanger 15 is provided in the first cooling loop 14 for cooling the coolant flowing through the fuel cell 12 to maintain the coolant in an appropriate temperature range.

FIG. 1 shows one variant, in which a second cooling loop 16 includes a second coolant pump 17, to circulate a second coolant. A second heat exchanger 18, e.g. a radiator, is provided to maintain the temperature of the coolant in the second cooling loop and again, where required, a second tank 19 (shown in FIG. 2) is provided. The coolant in the second cooling loop 16 may be any type of coolant as the coolants in the first and second cooling loops 14 and 16 do not mix. However, it is to be understood that the separate second cooling loop is not essential.

Figure 2:
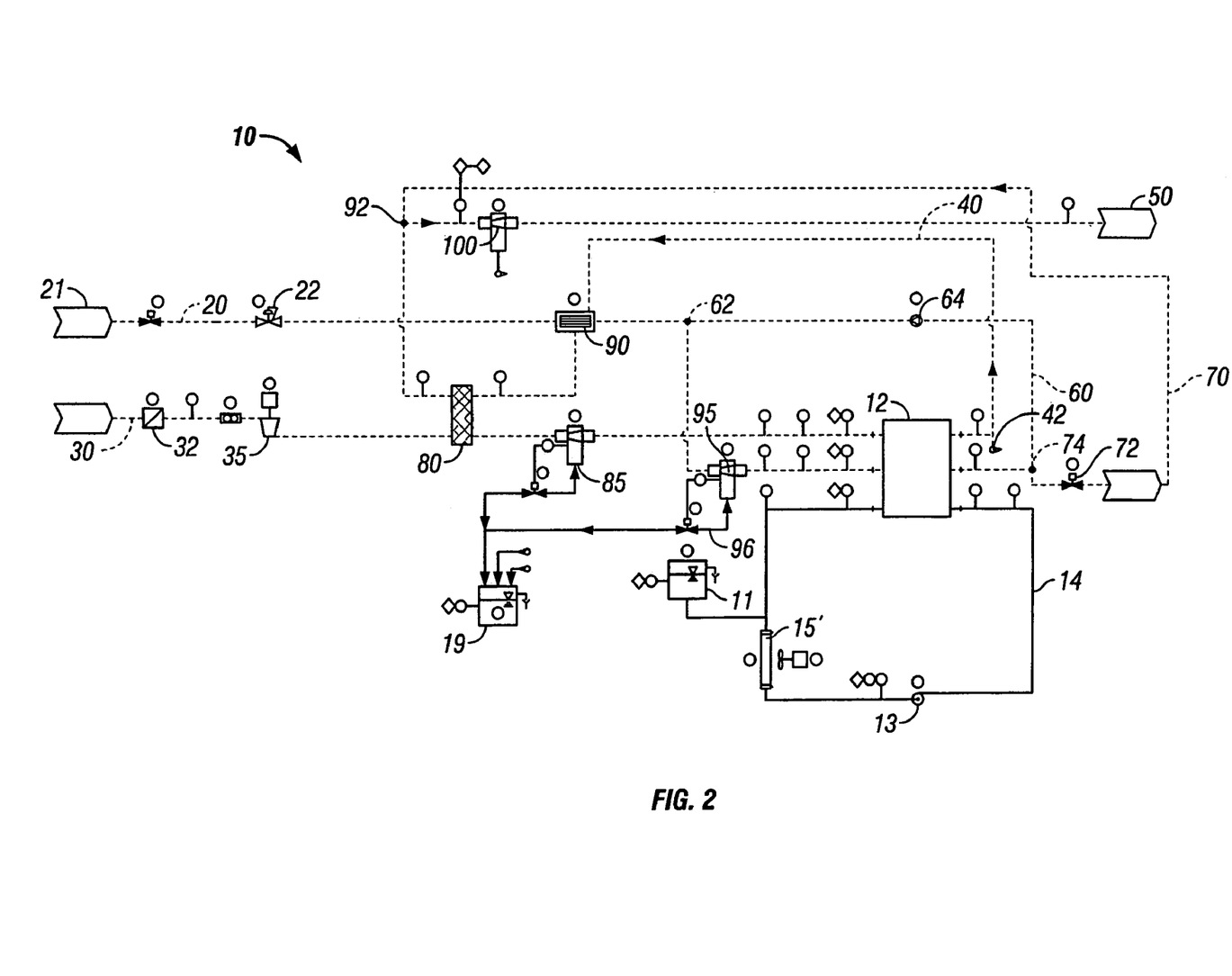
FIG. 2, in a schematic flow diagram, illustrates a second embodiment of a fuel cell gas and water management system to which aspects of the present invention may be applied.

Referring to FIG. 2, there is illustrated in a schematic flow diagram an alternative fuel cell gas and water management system. In FIG. 2, components similar to the components illustrated in FIG. 1 are indicated using the same reference numerals, and for simplicity and brevity, the description of these components is not repeated. As shown in FIG. 2, a heat exchanger 15 is provided in the first cooling loop 14 to maintain the temperature of the coolant in the first cooling loop 14 at a desired level. In this case, the second cooling loop 16 is omitted. It is to be understood that the heat exchanger 15 in FIG. 1 could also be an isolation, brazed plate heat exchanger disposed in an "open" loop, as may be desired in some applications. That is to say, the second cooling loop 16 can be an open cooling loop in which coolant is drawn from and returned to a coolant reservoir, such as atmosphere, sea, etc.

When water is used as coolant in either of the above variants, since the water from the separators 95, 85, 100 is product water from the fuel cell, and hence pure and non-conductive, it can be collected and directed to the expansion tank 11 or 19, or coolant reservoir as coolant during the fuel cell operation.

Preferably, a flow regulating device 22 is disposed in the fuel supply line 20 upstream from the hydrogen humidifier 90. The flow regulating device or valve 22 permits the flow of hydrogen from the hydrogen source 21 to the fuel cell 12 in response to the pressure drop in the fuel supply line 20. The flow regulating device 22 may be a forward pressure regulator having a set point that permits hydrogen to be supplied to the fuel cell 12 when the pressure in the fuel supply line 20 is below the set point due to the hydrogen consumption in the fuel cell 12. This forward pressure regulator avoids the need for an expensive mass flow controller and provides more response and accurate flow control.

Figure 4:
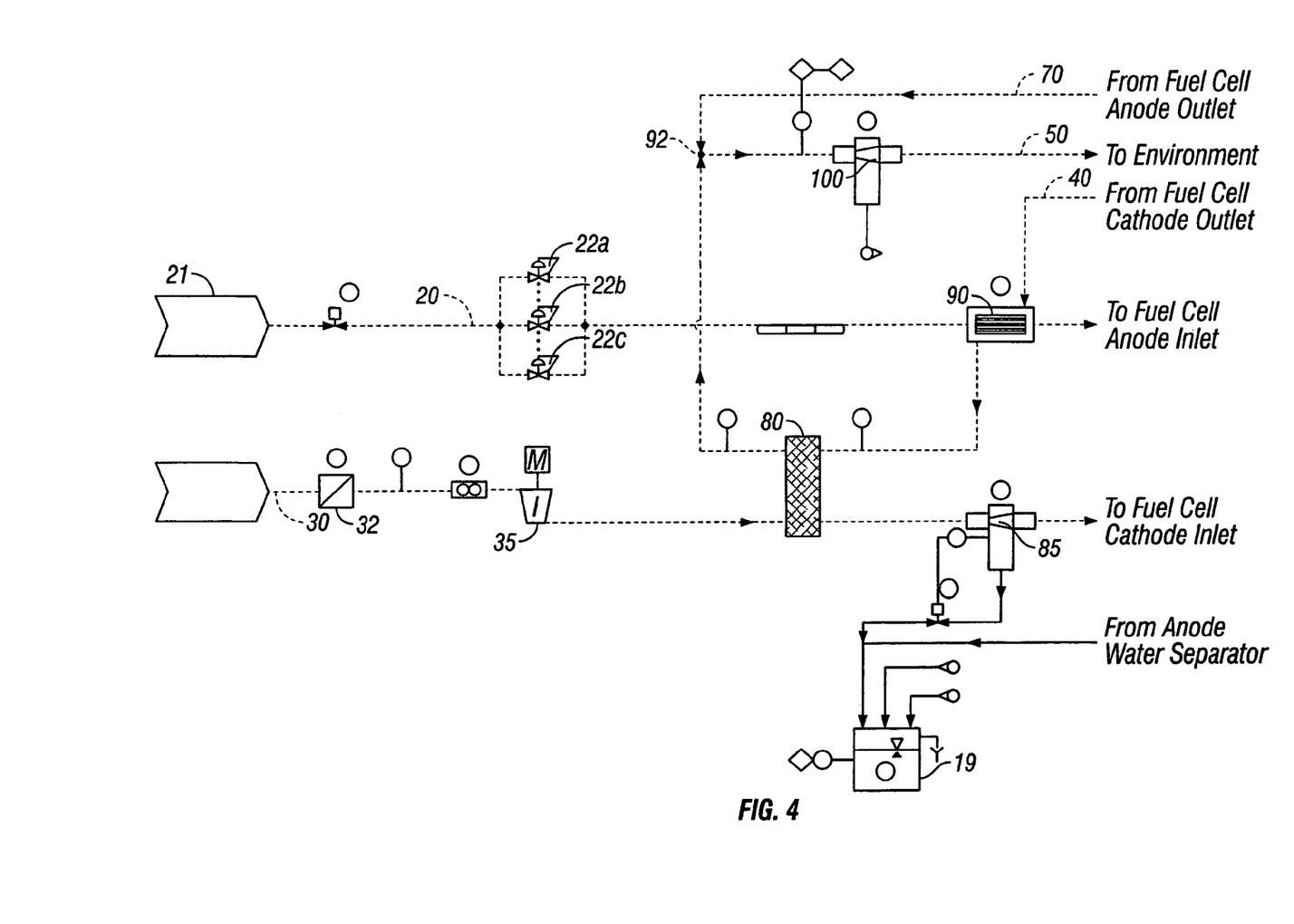
FIG. 4, in a partial schematic flow diagram, illustrates a fourth embodiment of a fuel cell gas and water management system to which aspects of the present invention may be applied.

Referring to FIG. 4, to provide more control flexibility, the flow regulating means 22 may comprise a plurality of pre-set forward pressure regulators arranged in parallel with each forward pressure regulator having a different set point. For example, a first forward pressure regulator 22a may have a set point of 10 Psig, a second forward pressure regulator 22b may have a set point of 20 Psig, a third forward pressure regulator 22c may have a set point of 30 Psig, and so on. This makes it possible to operate the fuel cell 12 with fuel supplied at different pressures and different rates at each pressure, without the need of interrupting the operation and changing the set point of the forward pressure regulator.

Figure 5A:
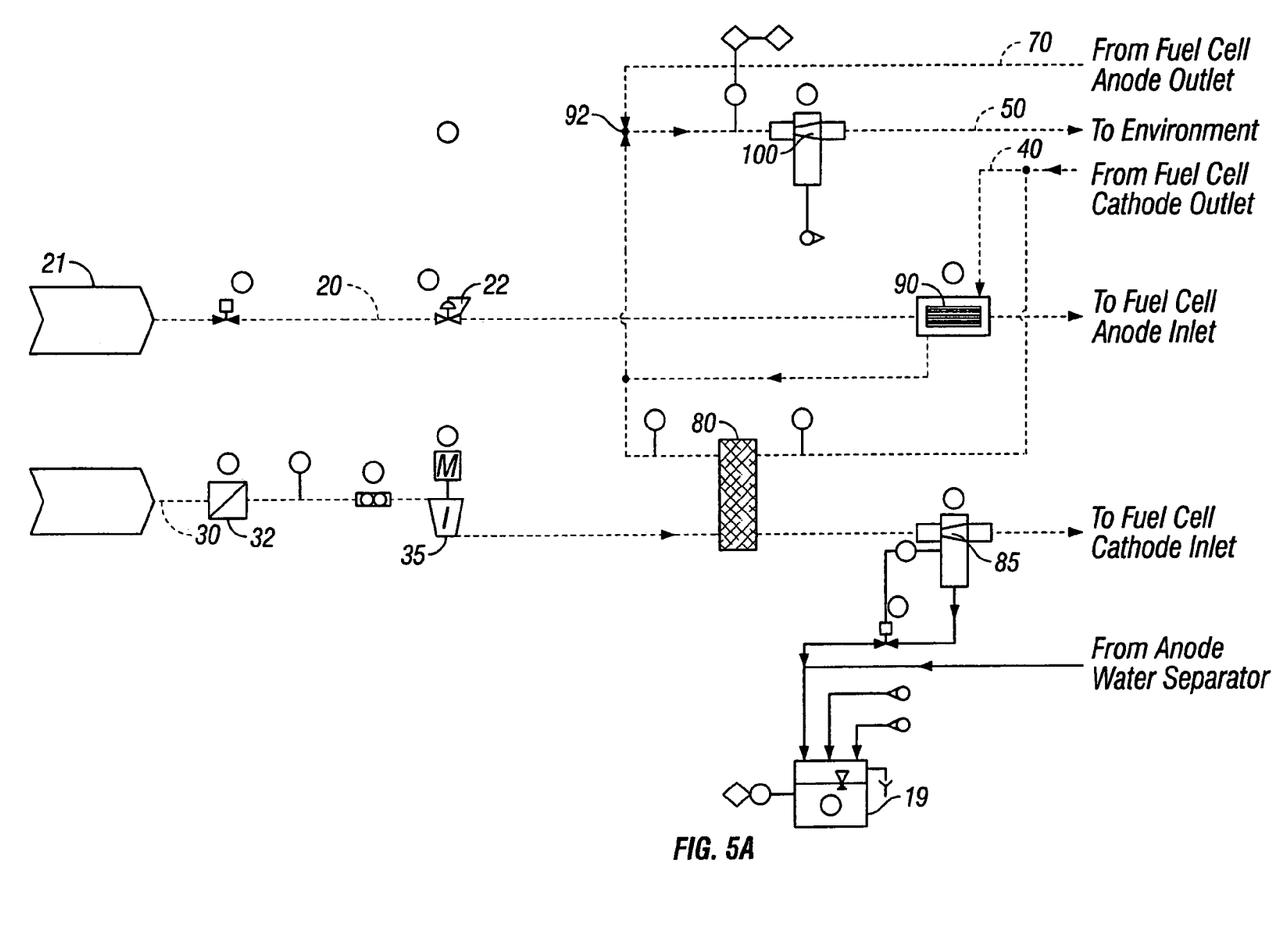
FIGS. 5*a* and 5*b*, in partial schematic flow diagrams, illustrate the connection of two regenerative dryer devices of a fuel cell gas and water management system to which aspects of the present invention may be applied.
Figure 5B:
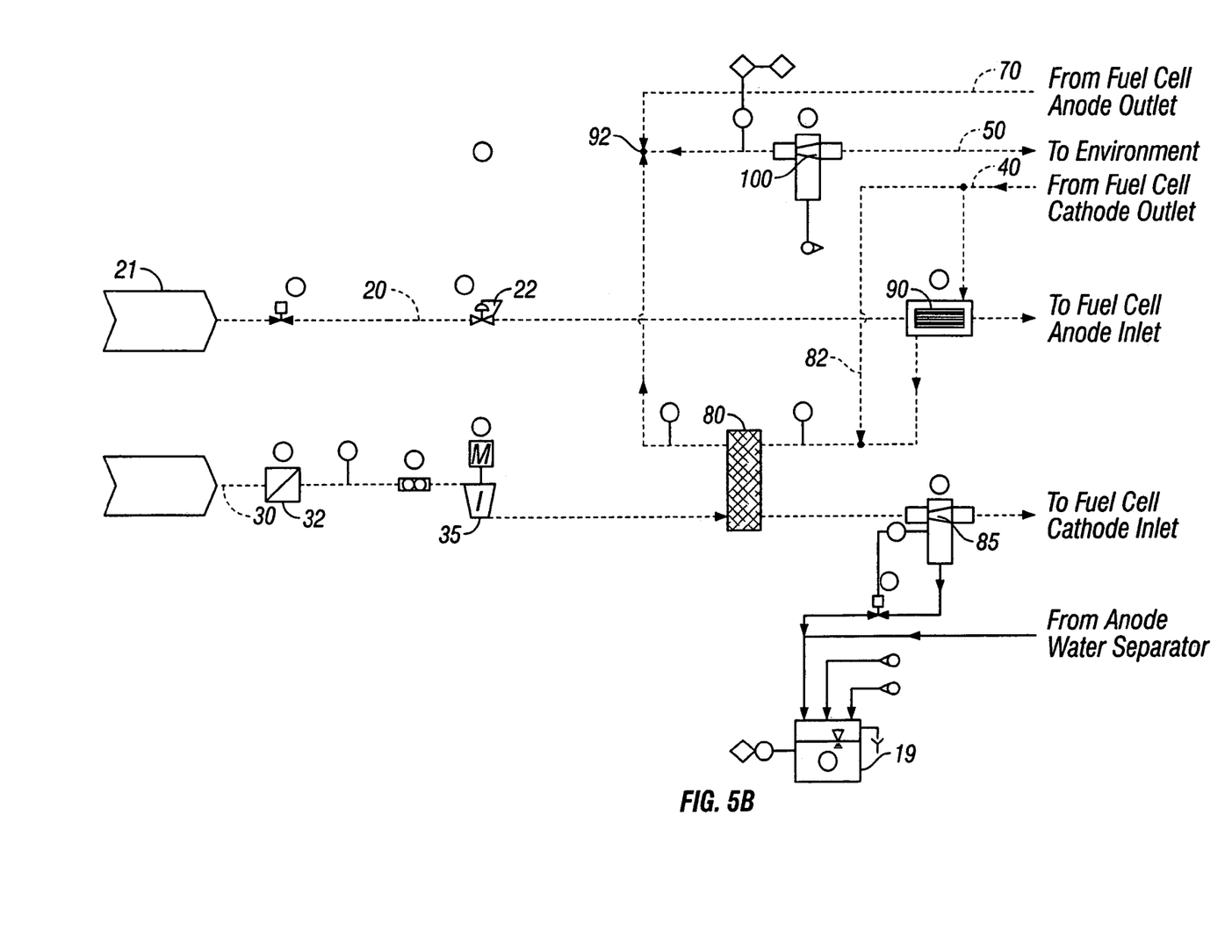

It is to be understood that although in this embodiment, the cathode exhaust is used to first humidify the incoming hydrogen and then the incoming air, this order is not essential. Instead, the cathode exhaust may be used to first humidify the incoming air and then the incoming hydrogen. Alternatively, as shown in FIG. 5a, the hydrogen humidifier 90 and the regenerative dryer 80 may be placed in parallel instead of series in the cathode exhaust recirculation line 60, so that the humidification of both hydrogen and air occurs simultaneously. Optionally, depending on the operation condition of the fuel cell 12, when the serial humidification is employed, a bypass line 82 may be further provided, as shown in FIG. 5b, to bypass the hydrogen humidifier 90 so that a portion of the cathode exhaust stream flows to the regenerative dryer 80 without passing through the hydrogen humidifier.

However, in practice it may be preferable to humidify the hydrogen stream first since the anode dew point temperature is desired to be higher than the cathode dew point temperature because water is naturally transferred from the anode to the cathode in the fuel cell 12. The desired relative humidity of hydrogen is also often higher than that of air in the fuel cell 12 so that the fuel cell 12 will not be flooded. Therefore, it is preferable to use the cathode exhaust stream to exchange heat and humidity with incoming hydrogen stream first.

In known manner, various sensors can be provided for measuring parameters of the stream of fuel, oxidant and coolant, supplied to the fuel cell 12. Optionally, the sensors can measure just the temperature of the reactants. The humidity would then be determined from known temperature—humidity characteristics, i.e. without directly measuring humidity.

It can be appreciated that it is not essential to over saturate process gases, condense water out to obtain 100% relative humidity and then deliver the process gases at certain temperature to get desired relative humidity before they enter the fuel cell 12, as in assignee's U.S. Pat. No. 6787,254. The present system is applicable to fuel cell systems where fuel and oxidant stream either have or do not have 100% relative humidity. An anode dew point heat exchanger and a cathode dew point heat exchanger may be provided to control the humidity of fuel and oxidant when the fuel cell 12 is not operable with fuel or oxidant having 100% relative humidity. However, this totally depends on the characteristic of the fuel cell 12, such as the operating condition of the proton exchange membrane. It can be appreciated that it is not essential to over saturate process gases, condense water out to obtain 100% relative humidity and then deliver the process gases at certain temperature to get desired relative humidity before they enter the fuel cell 12, as in the applicant's co-pending U.S. patent application Ser. No. 09/801,916. The present system is applicable to fuel cell systems where fuel and oxidant stream either have or do not have 100% relative humidity. An anode dew point heat exchanger and a cathode dew point heat exchanger may be provided to control the humidity of fuel and oxidant when the fuel cell 12 is not operable with fuel or oxidant having 100% relative humidity. However, this totally depends on the characteristic of the fuel cell 12, such as the operating condition of the proton exchange membrane.

Figure 3:
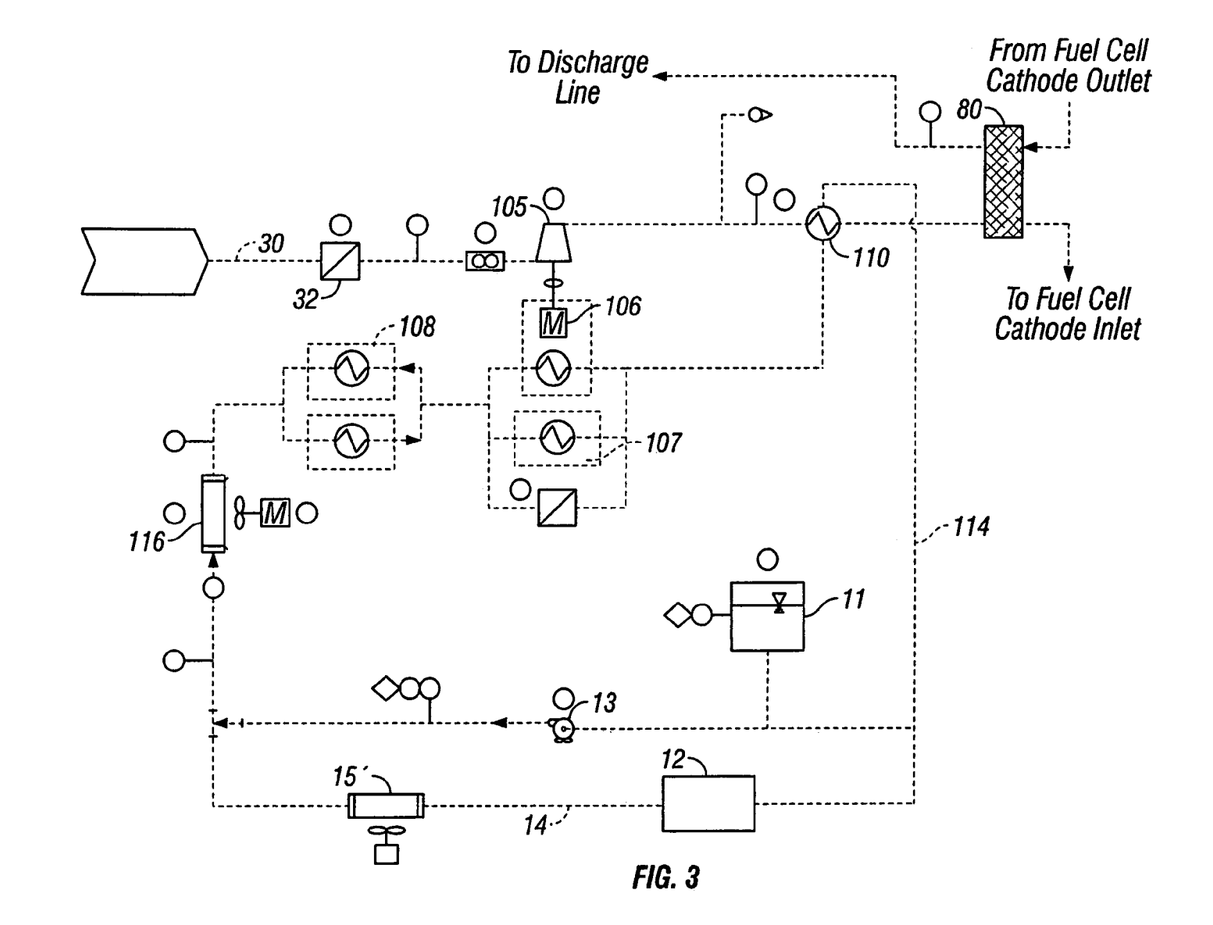
FIG. 3, in a partial schematic flow diagram, illustrates a third embodiment of a fuel cell gas and water management system, which operates under high pressure, to which aspects of the present invention may be applied.

It is also to be understood that this first embodiment of the fuel cell system to which the present invention can be applied operates under ambient pressure or near ambient pressure. Referring to FIG. 3, there are illustrated cooling loops for use in a third fuel cell system to which the present invention can be applied that operates under high pressure, i.e. greater than atmospheric pressure.

In the third fuel cell system, similar components are indicated with same reference numbers, and for simplicity and brevity, the description of those components is not repeated.

In this third fuel cell system, a high pressure compressor 105 is provided in the oxidant supply line 30 upstream from the regenerative dryer 80 to pressurize the incoming air from the air filter 32. An after cooler heat exchanger 110 is provided between the compressor 105 and the regenerative dryer 80 to cool the compressed air having an elevated temperature. Hence, in addition to the first cooling loop 14 for the fuel cell 12, a third cooling loop 114 is provided including the after cooler heat exchanger 110 in the form of a water-water heat exchanger. The third cooling loop 114 may also run through a compressor motor 106, a compressor motor controller 107 and a power switching board 108 for the compressor 105, for cooling these components. The coolant in both first and third cooling loops 14 and 114 is driven by the first coolant pump 13. Similar to the radiator 18 in a second cooling loop, a radiator 116 with a powered fan is provided in the third cooling loop 114 This radiator 116 could optionally be replaced by a different heat exchange mechanism.

Regardless of the pressure under which the fuel cell system is operating, it is often preferable to balance the pressure of both fuel stream and oxidant stream supplied to the fuel cell 12. This ensures no significant pressure gradient exists within the fuel cell 12 and hence prevents damage of the fuel cell and prevents flow of reactants and coolants in undesired directions caused by pressure gradient. In addition, this also ensures proper stoichiometry of fuel and oxidant is supplied to the fuel cell 12 for reaction.

Figure 6:
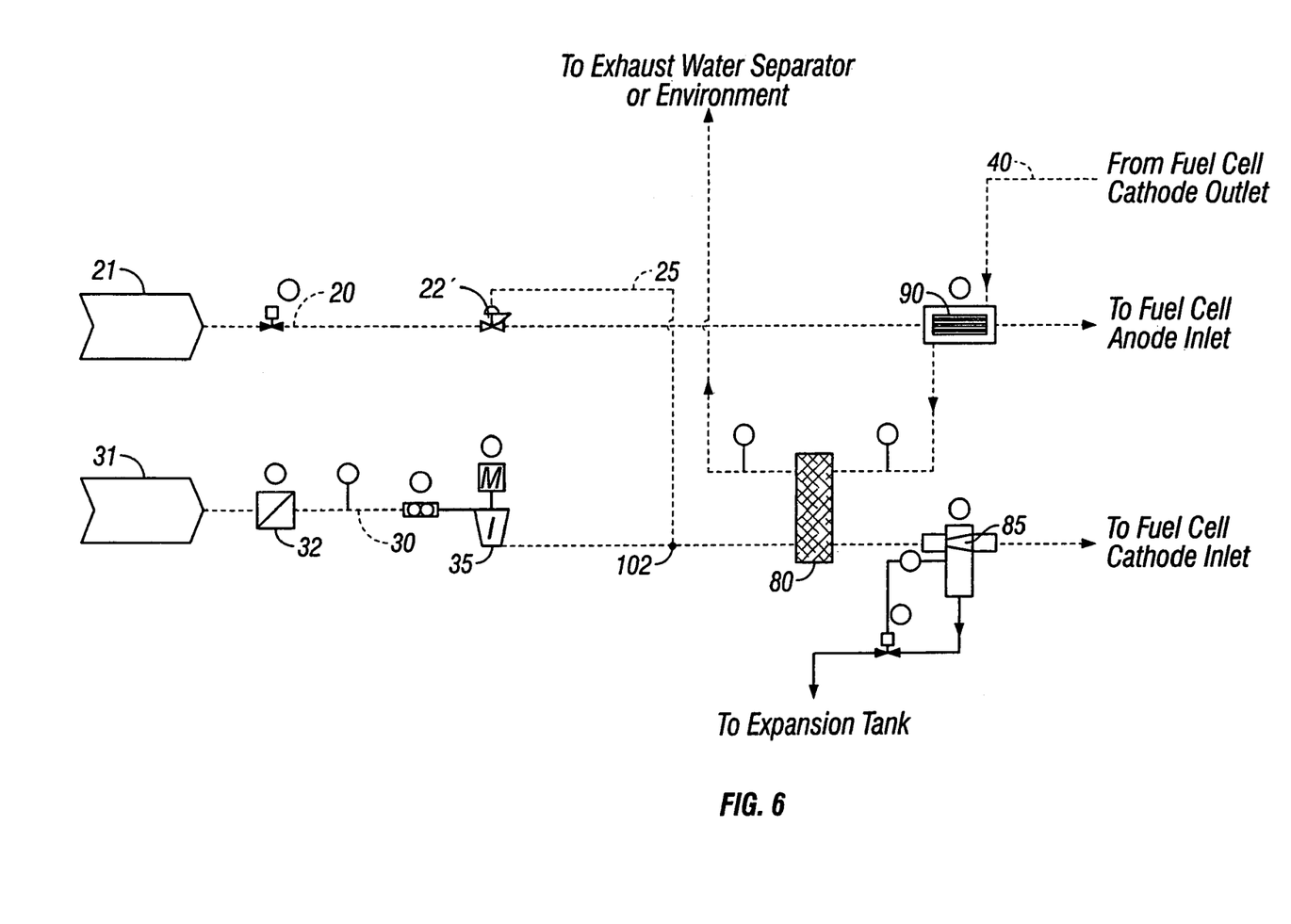
FIG. 6, in a partial schematic flow diagram, illustrates a pressure balancing mechanism of a fuel cell gas and water management system to which aspects of the present invention may be applied.

In the fuel cell systems illustrated, this is done by providing a balance pressure regulator 22' and a pressure balancing line 25 between the fuel supply line 20 and the oxidant supply line 30, as shown in FIG. 6. The pressure balancing line 25 fluidly connects the balance pressure regulator 22' disposed in the fuel supply line 20 upstream of the hydrogen humidifier 90, and a third joint 102 in the oxidant supply line 30 upstream of the regenerative dryer 80. The balance pressure regulator 22' can still be a forward pressure regulator. However, it has to be adapted to work with two fluid streams and serves to balance the pressure between the two fluid streams. An example of this balance pressure regulator 22' is disclosed in assignee's U.S. Pat. No. 6,866,061, incorporated herein by reference. Generally, such balance pressure regulator 22' regulates the hydrogen flow in response to the pressure of air stream introduced by the pressure balancing line 25, and achieves mechanical balance until the pressure of hydrogen flow is regulated to be equal to that of the air flow.

It can be appreciated that the pressure balancer can be disposed in oxidant supply line 30 so that the pressure of the air stream can be regulated in response to that of the hydrogen stream. However, in practice it is convenient to set the pressure of the air stream by a choosing suitable speed or capacity of blower or compressor and to change the pressure of the hydrogen stream accordingly. Hence, it is preferred to make the pressure of the hydrogen stream track that of the air stream. In some systems, the pressure balance between two reactant incoming streams are set manually or by a controller. However, the present configuration automatically ensures the pressure balance.

All the water used to humidify the fuel and oxidant is generated by the fuel cell 12 itself. This reduces the weight and number of components in the system, making the overall system compact and highly efficient. The system is capable of rapid response to power demands. All these features are particularly desirable for vehicular applications.

As shown in FIG. 1, the components in a fuel cell system consume energy while making sure the fuel cell is working. In order to get higher efficiency, it is desirable to minimize the energy consumed by these fuel cell peripherals. These peripherals operate in response to the operating range of fuel cell. Specifically, when the fuel cell is operating in a higher range, i.e. higher power output or larger current, the peripherals also need to run in a higher range, i.e. blower 35 needs to run at a higher speed to supply more air to the fuel cell. Cooling pump 13 also needs to run at a higher speed and so does the hydrogen recirculation pump 64 and the hydrogen purge frequency also needs to be increased since contaminants build up more rapidly.

In conventional fuel cell systems, these fuel cell peripherals tend to run at a relatively constant speed independent of the power output of the fuel cell, even when the load current drawn from the fuel cell 12 or load demand for the fuel cell 12 is relatively low. Therefore more energy is consumed by these peripherals than what is actually needed. The present invention aims to alleviate this problem. In the present invention, the overall operation spectrum of the fuel cell 12 is broken down into several ranges and the operation of the fuel cell peripherals is controlled to operate at different levels, at different operational characteristics, for each range, i.e. there is a fuel cell operation characteristic spectrum indicative of the power level and having at least two ranges, that are correlated to respective operational characteristics of at least one fuel cell peripheral. For example, when the load draws a small current from the fuel cell 12, which means the demand for energy is low, the coolant pump 13 and the hydrogen recirculation pump 64 run at lower speeds to minimize energy consumption and the hydrogen purge valve 72 purges hydrogen at a lower frequency to minimize fuel waste. An example is shown in Table 1 below, i.e. the valve 72 opens once every ten seconds when the current density is in the lowest range 0-0.1 A/cm$^2$, and once every 0-2 seconds for the highest range of greater than 0.6 amp/cm$^2$.

TABLE 1

| | Current Density (A/cm$^2$) | | | | |
|---|---|---|---|---|---|
| | 0-0.1 | 0.1-0.2 | 0.2-0.4 | 0.4-0.6 | >0.6 |
| H$_2$ purge frequency | 1/10 seconds | 1/2 seconds | 1/0.6 seconds | 1/0.4 seconds | 1/0.2 seconds |
| H2 recirculation frequency | 5 seconds/ 2 minutes | 10 seconds/ 2 minutes | 5 seconds/ 15 seconds | 5 seconds/ 8 seconds | full |

It is shown that the hydrogen purge frequency and hydrogen recirculation frequency increase as the fuel cell 12 operates on higher current density. A special example is when the load 200 does not draw any current from the fuel cell 12, which means the fuel cell is idle. In this case, the fuel cell peripherals are desired to operate at low end of their operation range. For this purpose, an additional idle mode can be added into the overall operation spectrum of the fuel cell and the fuel cell peripherals are controlled correspondingly.

For this purpose, a controller 300 is provided in the fuel cell system 10. The fuel cell 12 drives a load 200 via a load circuit 210. The controller 300 reads the current through the load circuit 210 via an amperemeter 250 in control line 330.

It is to be understood that the controller 300 can also obtain other characteristics of the operation of the fuel cell via different devices. For example, the controller may use power output or current density as a characteristic and split the overall spectrum of this characteristic into several ranges. Herein, an example of taking current density as the characteristic is shown for illustration only.

The controller 300 also controls the operation of the blower 35 via control line 350, the purge valve 72 via control line 320, the hydrogen recirculation pump 64 via control line 340, and coolant circulation pump 13 via control line 310. It is to be understood that two-way communication exists in these control lines, i.e. the controller 300 reads the current operation of values of the devices and sends control signals to these devices. It is also to be understood that the controller 300 may also control the operation of other fuel cell peripherals. For simplicity, these control lines are not shown. It can be appreciated that although only one central controller 300 is shown in FIG. 1, local controllers for each or a group of fuel cell peripherals can also be used.

Figure 1B:
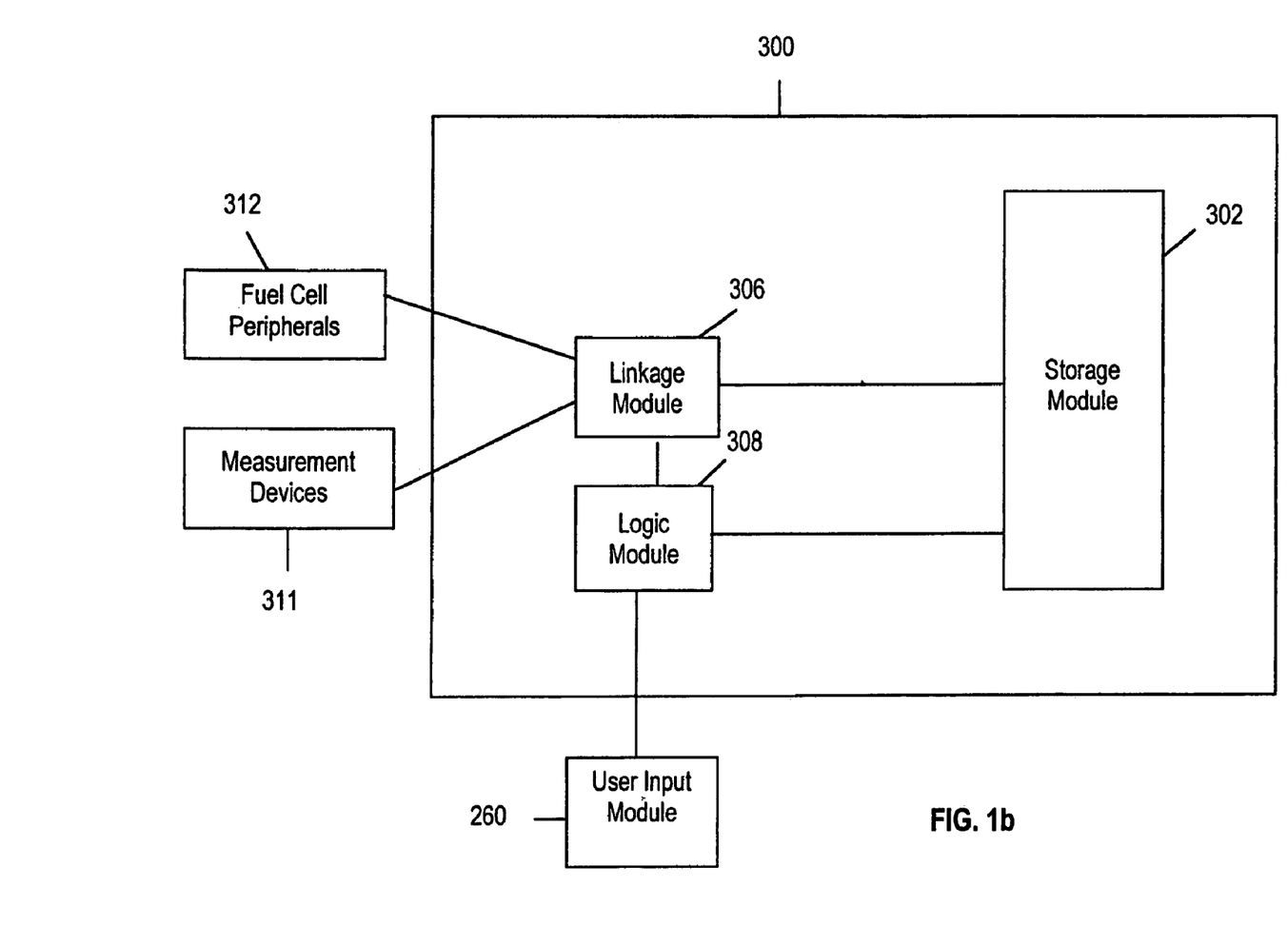
FIG. 1*b*, in a block diagram, illustrates a controller of the fuel cell gas and water management system of FIG. 1.

Referring to FIG. 1b, there is illustrated in a block diagram the controller 300 of FIG. 1. As shown, the controller 300 includes a linkage module 306 for linking the controller 300 to a plurality of fuel cell peripherals 312. The plurality of fuel cell peripherals 312 would include, for example, the blower 35, purge valve 72, hydrogen recirculation pump 64 and coolant circulation pump 64. Fuel cell peripherals 312 are controlled by controller 300 based on the operating level of the fuel cell system 10. Specifically, controller 300 is also linked, via a linkage module 306 to measurement devices 311 distributed in a fuel cell system. The measurement devices 311 measure fuel cell operation characteristics, such as, for example, current, current density and power output.

A fuel cell operation characteristic spectrum is stored in the storage module 302. This spectrum comprises a plurality of ranges. The fuel cell operation characteristics measured by the measurement devices fall within a particular range in this plurality of ranges. Each fuel cell peripheral is operable at a plurality of different levels. Each of these plurality of levels is correlated with an associated range in the plurality of ranges in the fuel cell operation characteristic spectrum. For example, a fuel cell peripheral such as the blower 35, might be operated at a low level when the fuel cell operation characteristic falls within a low range in the fuel cell operation characteristic spectrum. The correlation of the plurality of levels for each fuel cell peripheral with the plurality of ranges in the fuel cell operation characteristic spectrum is also stored in the storage module.

When the linkage module 306 receives the fuel cell operation characteristics from the measurement devices 311, the logic module 308 determines the range in which the fuel cell system 10 currently falls in the fuel cell operation characteristic spectrum. Then, based on the correlation between the plurality of levels for each fuel cell peripheral and the fuel cell operation characteristic spectrum stored in the storage module 302, the logic module 308 determines the appropriate level of operation for each fuel cell peripheral. Then, via the linkage module 306, the controller 300 controls each of these fuel cell peripherals 312 to operate at the appropriate level.

Fuel cell systems in accordance with aspects of the present invention enjoy many advantages over the existing fuel cell system. By splitting fuel cell operation spectrum into several ranges and controlling operation of fuel cell peripherals correspondingly in each of the range, parasitic load is considerably reduced and fuel waste is minimized. Hence system efficiency is increased.

While the above description constitutes the preferred embodiments, it will be appreciated that the present invention is susceptible to modification and change without departing from the fair meaning of the proper scope of the accompanying claims. For example, instead of splitting the fuel cell operation spectrum into ranges, this spectrum may be treated as a continuum and the operation of the fuel cell peripherals continuously varied depending upon the point in this continuum at which the fuel cell is presently operating. In addition, the present invention might have applicability in various types of fuel cells, which include but are not limited to, solid oxide, alkaline, molton-carbonate, and phosphoric acid. In particular, the present invention may be applied to fuel cells, which operate at much higher temperatures. As will be appreciated by those skilled in the art, the requirement for humidification is very dependent on the electrolyte used and also the temperature and pressure of operation of the fuel cell. Accordingly, it will be understood that the present invention may not be applicable to many types of fuel cells.

The invention claimed is:

1. A fuel cell system, comprising;
   a) a fuel cell having a power output for driving a load;
   b) at least one fuel cell peripheral;
   c) a measurement means for determining at least one fuel cell operation characteristic indicative of the power output of the fuel cell and having a fuel cell operation characteristic spectrum;
   d) at least one controller for controlling the operation of the at least one fuel cell peripheral based on the at least one fuel cell operation characteristic; and
   wherein said at least one fuel cell peripheral comprises at least one of a coolant recirculation pump, and a hydrogen purging device;
   wherein each fuel cell operation characteristic spectrum is divided into at least two ranges indicative of at least two corresponding ranges of power output, and the controller is adapted to control said at least one fuel cell peripheral to provide a respective, different and constant operational characteristic for said at least one fuel cell peripheral for each range.

2. A fuel cell system as claimed in claim 1, wherein the fuel cell operation characteristic is selected from the group consisting of current, current density and power output.

3. A fuel cell system as claimed in claim 2, wherein the controller comprises:
   a memory for storing a plurality of ranges in each fuel cell operation characteristic spectrum, and, for each fuel cell peripheral of said at least one fuel cell peripheral, a plurality of operational characteristics correlated with the plurality of ranges; and
   a processor for determining a current operating range in the plurality of ranges in the at least one fuel cell operation characteristic spectrum based on the at least one fuel cell operation characteristic measured by the measurement means, and for determining a current operational characteristic correlated with said current operating range;
   the controller being operable to operate each fuel cell peripheral at an operational characteristic correlated with said current operating range.

4. A fuel cell system as claimed in claim 3, wherein the plurality of operational characteristics of the at least one fuel cell operation characteristic includes an idle level in which the load does not draw current from the fuel cell.

5. A method of operating a fuel cell system comprising a fuel cell, and at least one fuel cell peripheral, comprising
   a) providing at least one of a coolant recirculation pump, and a hydrogen purging device as the at least one fuel cell peripheral;
   b) connecting a load to the fuel cell system and providing a drive current from the fuel cell system to drive the load;
   c) measuring at least one fuel cell operation characteristic having at least two ranges; and
   d) controlling an operational characteristic of the at least one fuel cell peripheral based on the at least one fuel cell characteristic, and for the at least two different ranges of the fuel cell operation characteristic, providing a respective, different and constant operational characteristic for said at least one fuel cell peripheral.

6. A method as defined in claim 5 wherein the fuel cell operation characteristic is selected from the group consisting of current, current density and power output.

7. A method as claimed in claim 6, wherein
   the at least one fuel cell operation characteristic is variable within a plurality of ranges in a fuel cell operation characteristic spectrum,
   step c) further comprises determining a current operating range of the fuel cell system, the at least one fuel cell peripheral being operable at a plurality of operational characteristics correlated with the plurality of ranges, and
   step (d) further comprises operating the at least one fuel cell peripheral at an operational characteristic correlated with the current operating range of the fuel cell system.

8. A fuel cell system as claimed in claim 1, wherein the fuel cell operation characteristic spectrum has a plurality of levels, and the levels of the fuel cell operation characteristic spectrum includes a plurality of ranges, with one range being an idle level in which the load does not draw current from the fuel cell.

9. A fuel cell system, comprising:
   a) a fuel cell having a power output for driving a load;
   b) at least one fuel cell peripheral, comprising at least one of a coolant recirculation pump and a hydrogen purging device;
   c) a measurement means for determining at least one fuel cell operation characteristic, indicative of the power output of the fuel cell and having a fuel cell operation characteristic spectrum; and
   d) at least one controller for controlling the operation of the at least one fuel cell peripheral based on the at least one fuel cell operation characteristic wherein said at least one fuel cell peripheral is capable of being run at a constant operational characteristic;
   wherein each fuel cell operation characteristic spectrum is divided into at least two ranges, and the controller is adapted to control said at least one fuel cell peripheral to provide a respective, different and constant operational characteristic for said at least one fuel cell peripheral for each range.

10. A fuel cell system as claimed in claim 9, wherein the fuel cell operation characteristic is selected from the group consisting of current, current density and actual power output.

11. A fuel cell system as claimed in claim 10, wherein the controller comprises:
    a memory for storing a plurality of ranges in each fuel cell operation characteristic spectrum, and, for each fuel cell peripheral of said at least one fuel cell peripheral, a plurality of operational characteristics correlated with the plurality of ranges; and a processor for determining a current operating range in the plurality of ranges in the at least one fuel cell operation characteristic spectrum based on the at least one fuel cell operation characteristic measured by the measurement means, and for determining a current operational characteristic correlated with said current operating range;

the controller being operable to operate each fuel cell peripheral at an operational characteristic correlated with said current range.

12. A fuel cell system as claimed in claim 11, wherein the plurality of operational characteristics of the at least one fuel cell operation characteristic includes an idle level in which the load does not draw current from the fuel cell.

13. A method of operating a fuel cell system comprising a fuel cell, and at least one fuel cell peripheral capable of being run at a constant operational characteristic, the method, comprising
  a) providing as the fuel cell peripheral at least one of a coolant recirculation pump and a hydrogen purging device;
  b) connecting a load to the fuel cell system and providing a drive current from the fuel cell system to drive the load;
  c) measuring at least one fuel cell operation characteristic having at least two ranges; and
  d) controlling an operational characteristic of the at least one fuel cell peripheral based on the at least one fuel cell characteristic, and for each range of the fuel cell operation characteristic, providing a respective, different and constant operational characteristic for said at least one fuel cell peripheral.

14. A method as claimed in claim 13, wherein
  the at least one fuel cell operation characteristic is variable within a plurality of ranges in a fuel cell operation characteristic spectrum,
  step (b) further comprises determining a current operating range of the fuel cell system,
  the at least one fuel cell peripheral is operable at a plurality of operational characteristics correlated with the plurality of ranges, and
  step (c) further comprises operating the at least one fuel cell peripheral at an operational characteristic correlated with the current operating range of the fuel cell system.

15. A fuel cell system comprising:
  (a) a fuel cell for driving a load;
  (b) a fuel cell peripheral comprising at least one of a coolant recirculation pump and a hydrogen purging device;
  (c) a measurement means for determining at least one fuel cell operation characteristic indicative of a power output of the fuel cell and having a fuel cell operation characteristic spectrum; and
  (d) at least one controller for controlling the operation of at least one fuel cell peripheral based on the at least one fuel cell operation characteristic;
  wherein each fuel cell operation characteristic spectrum is divided into at least two ranges indicative of at least two corresponding ranges of power output, and the controller is adapted to control said fuel cell peripheral to provide a respective, different and constant operation characteristic for said at least one fuel cell peripheral for each range;
  wherein the fuel cell includes a fuel inlet, a fuel outlet, an oxidant inlet and an oxidant outlet, a fuel supply line connected to the fuel inlet and an oxidant supply line connected to the oxidant inlet, and a recirculation line connected to the oxidant outlet and extending through at least one of a humidifier located in the fuel supply line for humidifying incoming fuel and another humidifier located in the oxidant supply line for humidifying incoming oxidant.

16. A fuel cell system as claimed in claim 15, wherein said fuel cell peripheral includes at least the coolant recirculation pump, and wherein the fuel cell system further includes a cooling circuit extending through the fuel cell and including the coolant recirculation pump for pumping coolant through the cooling circuit and a heat exchanger for discharging heat from the cooling circuit.

17. A fuel cell system as claimed in claim 16, including a second cooling circuit, wherein the heat exchanger of the first cooling circuit is located in the second cooling circuit for transferring heat to the second cooling circuit, and wherein the second cooling circuit includes a respective second pump and a second heat exchanger for discharging heat from the second cooling circuit, the second pump further comprising one of said fuel cell peripheral.

18. A fuel cell system as claimed in claim 16, wherein a fuel cell operates at a pressure in excess of atmospheric pressure and a compressor is provided for compressing incoming air, as an oxidant, for supply to the oxidant inlet of the fuel cell; and
  wherein the first coolant loop additionally includes at least one of a heat exchanger for cooling the compressor and a heat exchanger in the oxidant supply line downstream from the compressor for cooling compressed air.

* * * * *